(12) United States Patent
Stevens et al.

(10) Patent No.: US 8,184,793 B2
(45) Date of Patent: May 22, 2012

(54) MULTI-LINE TELEPHONE CALLING

(75) Inventors: J. Clarke Stevens, Littleton, CO (US); F. Joseph Glynn, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 1814 days.

(21) Appl. No.: 10/894,698

(22) Filed: Jul. 20, 2004

(65) Prior Publication Data

US 2006/0018452 A1 Jan. 26, 2006

(51) Int. Cl.
*H04M 3/42* (2006.01)

(52) U.S. Cl. ......... 379/207.07; 379/207.08; 379/210.02

(58) Field of Classification Search ............... 379/93.07, 379/242, 156, 165, 207.01, 207.06, 221.01, 379/207.07, 207.08, 210.02, 211.02; 370/352, 370/428

See application file for complete search history.

(56) References Cited

U.S. PATENT DOCUMENTS

| | | | |
|---|---|---|---|
| 5,206,901 A | 4/1993 | Harlow et al. | |
| 5,572,583 A | 11/1996 | Wheeler, Jr. et al. | |
| 5,583,920 A | 12/1996 | Wheeler, Jr. | |
| 5,732,130 A | 3/1998 | Iapalucci et al. | |
| 5,764,743 A * | 6/1998 | Goedken et al. | 379/156 |
| 5,805,587 A | 9/1998 | Norris et al. | |
| 5,848,132 A | 12/1998 | Morley et al. | |
| 5,905,792 A | 5/1999 | Miloslavsky | |
| 5,930,338 A | 7/1999 | McKendry et al. | |
| 5,953,322 A | 9/1999 | Kimball | |
| 6,055,306 A | 4/2000 | Lozinski et al. | |
| 6,075,783 A | 6/2000 | Voit | |
| 6,118,864 A | 9/2000 | Chang et al. | |
| 6,125,177 A | 9/2000 | Whittaker | |
| 6,141,341 A * | 10/2000 | Jones et al. | 370/352 |
| 6,175,562 B1 | 1/2001 | Cave | |
| 6,185,204 B1 | 2/2001 | Voit | |
| 6,205,211 B1 | 3/2001 | Thomas et al. | |
| 6,282,192 B1 | 8/2001 | Murphy et al. | |
| 6,304,565 B1 | 10/2001 | Ramamurthy | |
| 6,351,464 B1 | 2/2002 | Galvin et al. | |
| 6,353,611 B1 | 3/2002 | Norri et al. | |
| 6,363,424 B1 | 3/2002 | Douglas et al. | |
| 6,381,459 B1 | 4/2002 | Gervens et al. | |
| 6,404,782 B1 * | 6/2002 | Berenbaum et al. | 370/522 |
| 6,421,424 B1 | 7/2002 | Creamer et al. | |
| 6,426,955 B1 | 7/2002 | Gossett Dalton, Jr. et al. | |
| 6,430,281 B1 | 8/2002 | Morley et al. | |
| 6,438,220 B1 | 8/2002 | Liu | |

(Continued)

OTHER PUBLICATIONS

U.S. Appl. No. 10/894,682, Office Action dated Nov. 28, 2008, 8 pgs.

(Continued)

*Primary Examiner* — Curtis Kuntz
*Assistant Examiner* — Yosef K Laekemariam
(74) *Attorney, Agent, or Firm* — Swanson & Bratschun, L.L.C.

(57) ABSTRACT

Network architectures, methods, and operations for routing telephone calls are disclosed. A customer premise includes a conventional POTS dedicated communication line to a central office switch and a broadband connection to a data network. The central office switch and the data network are connected by a communication link. A first telephone call originated at the customer premise may be connected via the dedicated communication link. A second or subsequent call originated at the customer premise may be connected via the data network. Optionally, the same call identifier may be assigned to the first and second or subsequent calls.

20 Claims, 7 Drawing Sheets

U.S. PATENT DOCUMENTS

| | | | |
|---|---|---|---|
| 6,480,588 B1 | 11/2002 | Donovan | |
| 6,487,283 B2 | 11/2002 | Thomas et al. | |
| 6,519,252 B2 | 2/2003 | Sallberg | |
| 6,535,521 B1 | 3/2003 | Barghouti et al. | |
| 6,542,499 B1 | 4/2003 | Murphy et al. | |
| 6,574,469 B1 | 6/2003 | Xiang et al. | |
| 6,584,108 B1 | 6/2003 | Chung et al. | |
| 6,594,253 B1 | 7/2003 | Sallberg et al. | |
| 6,606,668 B1 | 8/2003 | MeLampy et al. | |
| 6,614,774 B1 | 9/2003 | Wang | |
| 6,614,781 B1 * | 9/2003 | Elliott et al. | 370/352 |
| 6,625,258 B1 | 9/2003 | Ram et al. | |
| 6,650,740 B1 | 11/2003 | Adamczyk et al. | |
| 6,654,348 B1 | 11/2003 | Doty, II et al. | |
| 6,665,395 B1 | 12/2003 | Busey et al. | |
| 6,792,097 B2 * | 9/2004 | Bakke | 379/219 |
| 7,016,675 B1 | 3/2006 | Schuster et al. | |
| 7,061,901 B1 | 6/2006 | Shnitzer et al. | |
| 7,103,167 B2 | 9/2006 | Brehm et al. | |
| 7,336,649 B1 | 2/2008 | Huang | |
| 2001/0028642 A1 | 10/2001 | Veschi | |
| 2001/0032270 A1 | 10/2001 | Koo | |
| 2002/0002041 A1 | 1/2002 | Lindgren et al. | |
| 2003/0012178 A1 | 1/2003 | Mussman et al. | |
| 2003/0048795 A1 | 3/2003 | Pinault | |
| 2003/0072272 A1 | 4/2003 | Koide et al. | |
| 2003/0095539 A1 | 5/2003 | Feuer | |
| 2003/0095541 A1 * | 5/2003 | Chang et al. | 370/352 |
| 2003/0095542 A1 | 5/2003 | Chang et al. | |
| 2003/0143978 A1 | 7/2003 | Cooper et al. | |
| 2003/0154083 A1 | 8/2003 | Kobylevsky et al. | |
| 2003/0154408 A1 | 8/2003 | Zhu et al. | |
| 2003/0179743 A1 | 9/2003 | Bosik et al. | |
| 2003/0187926 A1 | 10/2003 | Karjanlahti | |
| 2003/0191647 A1 | 10/2003 | Kam | |
| 2003/0193696 A1 | 10/2003 | Walker et al. | |
| 2003/0202507 A1 | 10/2003 | Nishida et al. | |
| 2003/0210677 A1 | 11/2003 | Grove et al. | |
| 2003/0210697 A1 | 11/2003 | Mercier | |
| 2003/0219011 A1 | 11/2003 | Han | |
| 2003/0227907 A1 | 12/2003 | Choi et al. | |
| 2003/0235182 A1 | 12/2003 | McMullin | |
| 2004/0008717 A1 | 1/2004 | Verma et al. | |
| 2004/0008824 A1 | 1/2004 | Resuta | |
| 2004/0017802 A1 | 1/2004 | Scholtz et al. | |
| 2004/0022237 A1 | 2/2004 | Elliott et al. | |
| 2004/0030785 A1 | 2/2004 | Katoh | |
| 2004/0037402 A1 | 2/2004 | Adamczyk et al. | |
| 2005/0190756 A1 | 9/2005 | Mundra et al. | |
| 2006/0018310 A1 | 1/2006 | Stevens et al. | |
| 2006/0018448 A1 | 1/2006 | Stevens et al. | |
| 2006/0018449 A1 | 1/2006 | Stevens et al. | |
| 2006/0077971 A1 | 4/2006 | Fowler | |

OTHER PUBLICATIONS

U.S. Appl. No. 10/894,682, Office Action dated Jun. 12, 2008, 14 pgs.

U.S. Appl. No. 10/894,634, Final Office Action dated Dec. 2, 2008, 16 pgs.

U.S. Appl. No. 10/894,634, Office Action dated May 21, 2008, 14 pgs.

U.S. Appl. No. 10/894,635, Final Office Action dated Nov. 14, 2008, 11 pgs.

U.S. Appl. No. 10/894,635, Final Office Action dated May 22, 2008, 13 pgs.

* cited by examiner

MULTI-LINE TELEPHONE CALLING

RELATED APPLICATIONS

This application is related to commonly assigned and concurrently filed U.S. patent application Ser. No. 10/894,634, entitled ROUTING TELEPHONE CALLS VIA A DATA NETWORK, U.S. patent application Ser. No. 10/894,682, entitled DATA NETWORK CALL ROUTING, and U.S. patent application Ser. No. 10/894,635, entitled TELEPHONE CALL ROUTING, the entire disclosures of which are hereby incorporated by reference.

TECHNICAL FIELD

The described subject matter relates to electronic communication, and more particularly to telephone call routing.

BACKGROUND

Telecommunication service providers have been providing Plain Old Telephone Service (POTS) to consumers for decades. A conventional POTS network architecture connects one or more telephones at a customer premise to a central office switch, sometimes referred to as a Class 5 switch, using a dedicated communication line such as e.g., a twisted pair of copper wires. The central office switch is connected to the Public Switched Telephone Network (PSTN). When a telephone is removed from its cradle (i.e., taken off-hook), a signal is transmitted to the central office switch across the dedicated communication line. In response to the signal, the central office switch generates and transmits an electrical signal that generates a dial tone at the telephone, indicating that the user can input digits to generate an outbound call.

In the United States, the phone(s) at the customer premise are identified by the conventional North America Numbering Plan (NANP) which specifies a ten-digit (NXX-NXX-XXXX) telephone number. Inbound calls destined for a specified telephone number are routed to the central office switch connected to the customer premise. The central office switch receives the call, rings the identified telephone number by transmitting an electrical signal across the dedicated communication line, and connects the call if a telephone at the specified telephone number transitions to an off-hook state in response to the ring signal. The introduction of overlay signaling networks such as, e.g., the SS7 network into the PSTN has made slight changes in the operation of the PSTN, but the basic network architecture and operations remain intact.

Broadband networks such as Digital Subscriber Line (DSL) networks allow distribution of combined broadband data and video services with traditional narrowband voice transmissions. Numerous DSL standards exist to enable high data-rate communication over a variety of physical media and in a variety of network configurations.

Improved integration between conventional voice telecommunication services and broadband services may be beneficial to consumers.

SUMMARY

Implementations described and claimed herein solve the discussed problems, and other problems, by providing network architectures, methods, and operations for routing telephone calls. A customer premise includes a conventional POTS dedicated communication line to a central office switch and a broadband connection to a data network. The central office switch and the data network are connected by a communication link. A first telephone call originated at the customer premise may be connected via the dedicated communication link. A second or subsequent call originated at the customer premise may be connected via the data network.

DETAILED DESCRIPTION

Described herein are exemplary network architectures and methods for telephone call routing. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Network Architecture

Figure 1:
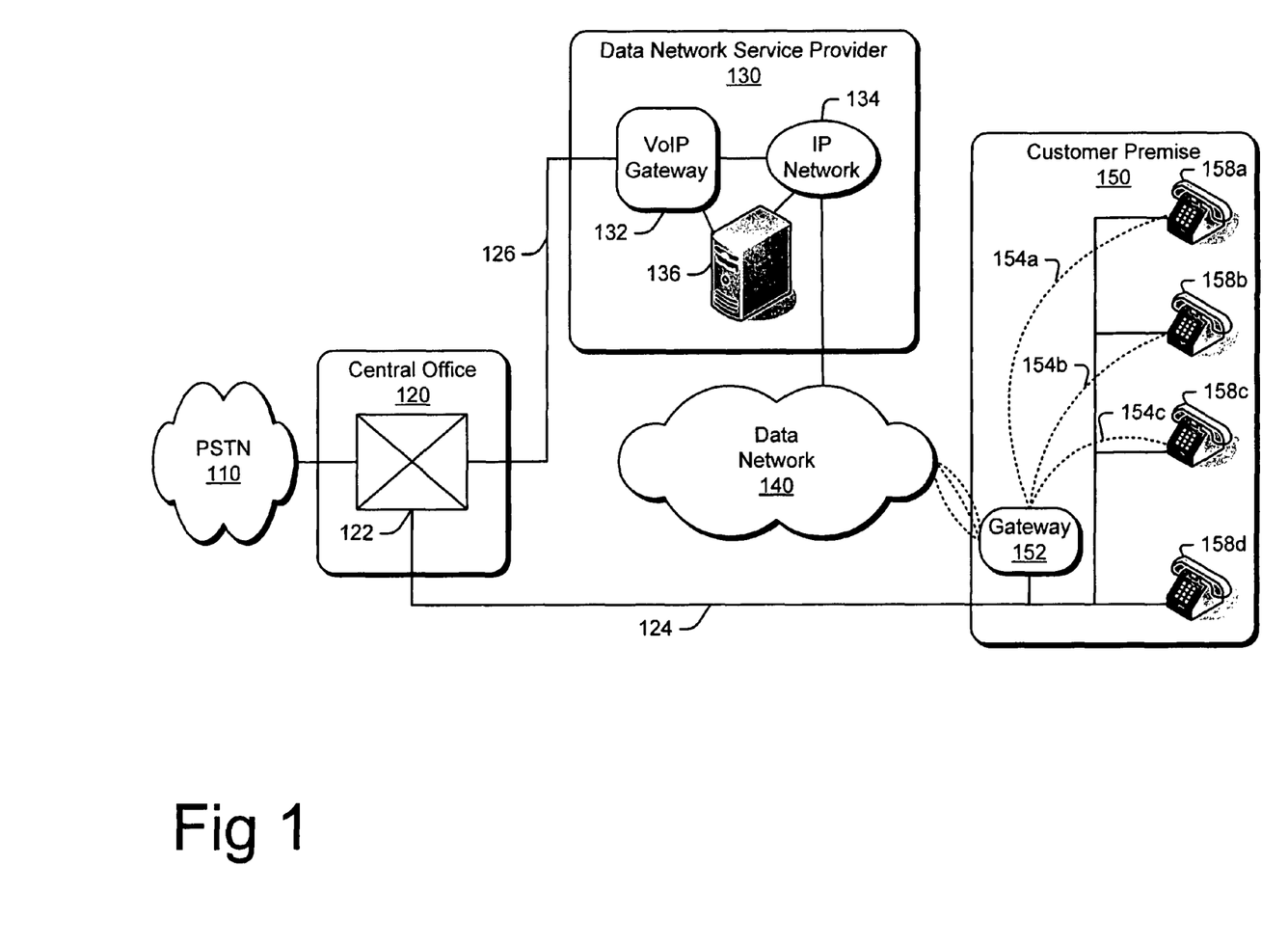
FIG. 1 is a schematic illustration of an exemplary network architecture.

FIG. 1 is a schematic illustration of an exemplary network architecture for telephone call routing. Referring to FIG. 1, a customer premise 150 is connected to the PSTN 112 by a dedicated communication line 124 with a central office switch 122. PSTN 112 generally represents the circuit-switched public switched telephone network that carries the vast majority of voice communication. The central office 120 represents a central office facility operated by a local exchange carrier, i.e., an ILEC or a CLEC. The dedicated communication line 124 may be a POTS telephone line embodied as a conventional copper wire "local loop" or may include multiple segments of differing physical media.

Central office switch 122 may be implemented as a Class 5 (CL5) switch. CL5 switches are typically owned and operated by the Local Exchange Carrier (LEC). A CL5 switch has a plurality of physical ports that are referred to as interface Directory Numbers (iDNs). The ports represent telephone numbers (or lines) provisioned on the Class 5 switch. These lines may be grouped into Feature Groups based on the services that are provisioned in the respective switch 122, such as call-waiting, three-way calling, etc.

The CL5 switch 122 may be connected to other CL5 switches via transmission circuits so that inter-office trunking between the switches is possible. Central Office 120 may also include an Intelligent Service Control Point (ISCP) that provides call signaling via, e.g., Signaling System No. 7 (SS7) signaling.

Customer premise 150 also includes a broadband gateway 152 that provides a broadband connection to a data network 140, which may be embodied as the public Internet or a private data network. Broadband gateway 152 may be implemented as a Digital Subscriber Link (DSL) gateway. In an alternate implementation broadband gateway 152 may be embodied as a cable modem.

DSL signal architectures, generally denoted as xDSL, allow digital distribution of combined broadband video and data services using physical plant conventionally used for traditional narrowband voice transmissions.

There are multiple DSL service architectures. Asymmetric digital subscriber line (ADSL) provides a high-speed data service over existing unshielded twisted pair (UTP) copper wires from a telephone company central office to the subscriber premise. ADSL is capable of providing a downstream bandwidth of about 1.5 Mbps-8 Mbps, and an upstream bandwidth of about 16 Kbps-64 Kbps across loop distances ranging from about 3.7 km-5.5 km.

High bit rate digital subscriber (HDSL) provides a symmetric, high-performance connection over a shorter loop, and typically require two or three copper twisted pairs. HDSL is capable of providing both upstream and downstream bandwidth of about 1.5 Mbps, over loop distances of up to about 3.7 km. Single line digital subscriber line (SDSL) provides a symmetric connection that matches HDSL performance using a single twisted pair, but operates over a shorter loop of up to about 3.0 km.

Very high speed Digital Subscriber Line (VDSL) provides high bandwidth distribution of digital video and data signals to customer buildings. VDSL services are typically implemented in an asymmetric form having a downstream transmission capability of about 52 Mbps over twisted pair copper wire arranged in local loops of 300 meters, 26 Mbps at 1,000 meters, and 13 Mbps at 1,500 meters. Upstream data rates in asymmetric implementations tend to range from about 1.6 Mbps to about 2.3 Mbps. A typical distribution system includes a central office equipped with a host digital terminal (HDT) and arranged to operate as a hub between multiple video information providers (VIPs)/digital service providers (DSPs) and customer residential dwellings. In a fiber-to-the neighborhood (FTTN) type distribution system, optic fiber (e.g., OC-3c and OC-12c) lines are used to connect the central office to a universal system access multiplexer (USAM), which is then connected to a network interface device (NID) located on the customer property via twisted pair copper wire. A dedicated VDSL loop extends between the NID and an individual customer residence using an existing POTS or telephone system twisted pair wire, and a customer interface device, such as a residential gateway or set top box, provides a connection point for a customer television or personal computer. A fiber-to-the-curb (FTTC) type distribution system is similar except that a broadband network unit (BNU) is used in place of the USAM, and coaxial cable is used to connect the BNU, NID, and set top box.

A data network service provider 130 connected to the central office switch 122 via a communication link 126 operates a voice over internet protocol (VoIP) service. In one exemplary implementation communication link 126 may be embodied as a dedicated data link such as, e.g., a local area network (LAN) or a wide area network (WAN). Data network service provider 130 operates a VoIP gateway 132 that is connected to the central office switch 122. The VoIP gateway provides the interface between the VoIP communications devices and the PSTN network.

The VoIP gateway 132 receives calls from the central office switch 122 over data connection 126 and routes the calls over data network 140. In the exemplary implementation depicted in FIG. 1, calls may be routed over a local IP network 134 before routing to data network 140. Data network service provider 130 may also operate a feature server 136.

At the customer premise 150 dedicated communication line 124 is connected to a plurality telephones 158*a*, 158*b*, 158*c*, 158*d*. In addition, broadband gateway 152 enables data connections 154*a*, 154*b*, 154*c* with a plurality of telephones 158*a*, 158*b*, 158*c*. The data connections 154*a*, 154*b*, 154*c* may be implemented using the existing telephone wiring using, e.g, an HPNA network, a LAN, or the like. Alternatively, the data connections 154*a*, 154*b*, 154*c* may be implemented over a wireless interface such as, e.g., an 802.11a, 802.11b, 802.11g, or Bluetooth network. The particular transmission medium used to implement data connections 154*a*, 154*b*, 154*c* is not critical.

Figure 2:
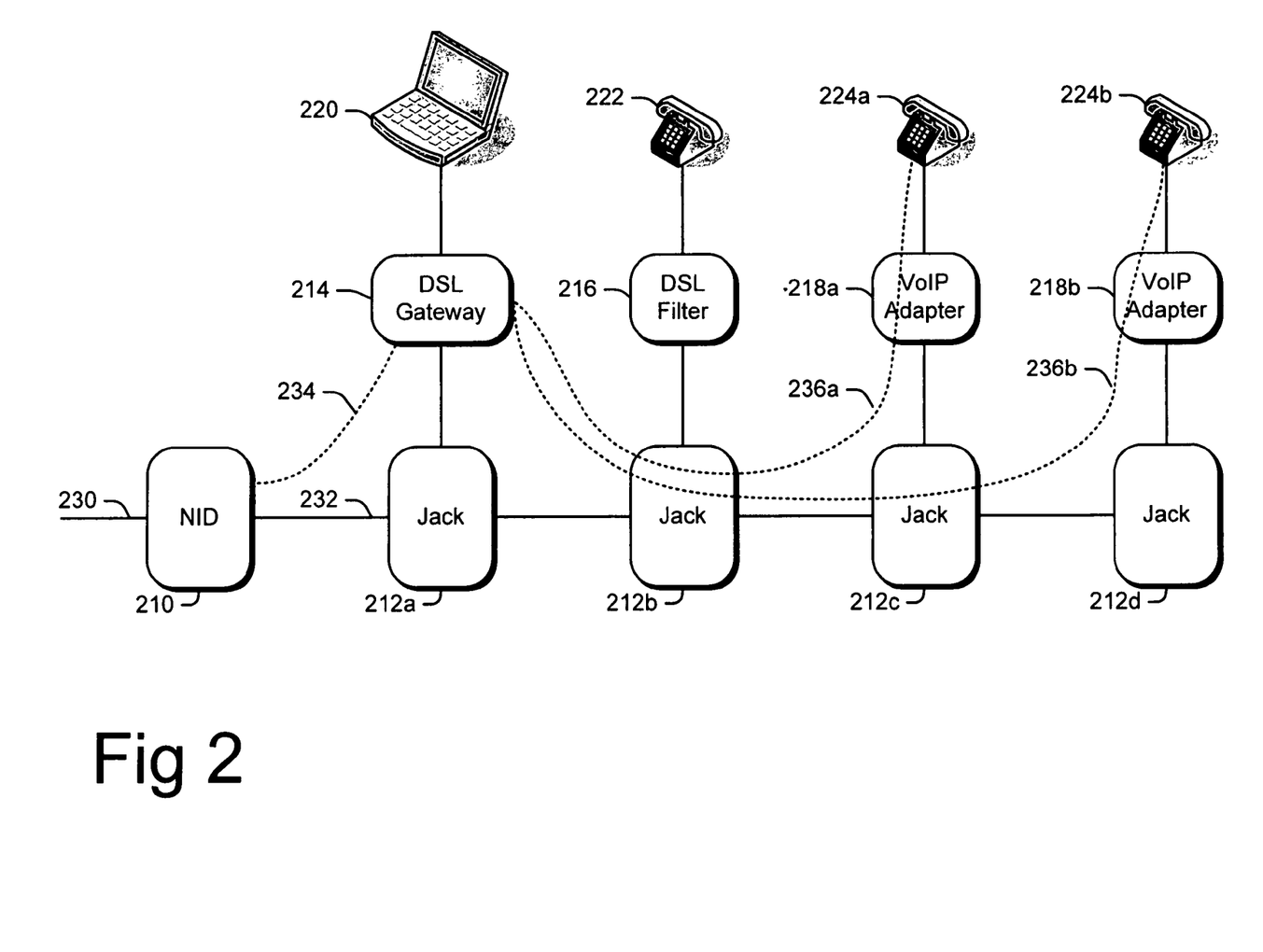
FIG. 2 is a schematic illustration of an exemplary customer premise network architecture.

FIG. 2 is a schematic illustration of an exemplary customer premise network architecture. A conventional POTS telephone local loop 230 is connected to the customer premise Network Interface device (NID) 210. Within the customer premise internal wiring 232 connects a plurality of phone jacks 212*a*, 212*b*, 212*c*, 212*d* to the NID 210. ADSL gateway 214 is connected to phone jack 212*a*. DSL gateway 214 may be used to provide a broadband connection to one or more personal computers 220. One or more conventional telephones 222 may be connected to one or more phone jacks 212*b* via a conventional DSL filter 216. In addition, one or more VoIP phones 224*a*, 224*b* may be connected to one or more phone jacks 212*c*, 212*d* via respective VoIP adapters 218*a*, 218*b*. VoIP phones 224*a*, 224*b* and VoIP adapters 218*a*, 218*b* are commercially available from multiple vendors (e.g., 2Wire).

The architecture illustrated in FIG. 2 provides data connections between DSL gateway 214 and VoIP phones 224*a*, 224*b* that enable VoIP phones to conduct VoIP telephone calls. The data connection may be established over a HPNA Ethernet network. Many VoIP phones 224*a*, 224*b* are also capable of conducting POTS telephone calls. VoIP phones 224*a*, 224*b* may include logic circuitry that enables a user to select POTS telephone service, rather than VoIP service. In addition, VoIP adapters 218*a*, 218*b* may include logic circuitry that detects a failure in the data network and, in response thereto, fails-over to POTS telephony.

Having provided a description of exemplary network architectures for telephone call routing, various operations for telephone call routing will be explained with reference to the flowcharts illustrated in FIGS. 3-6.

Exemplary Operations

Figure 3:
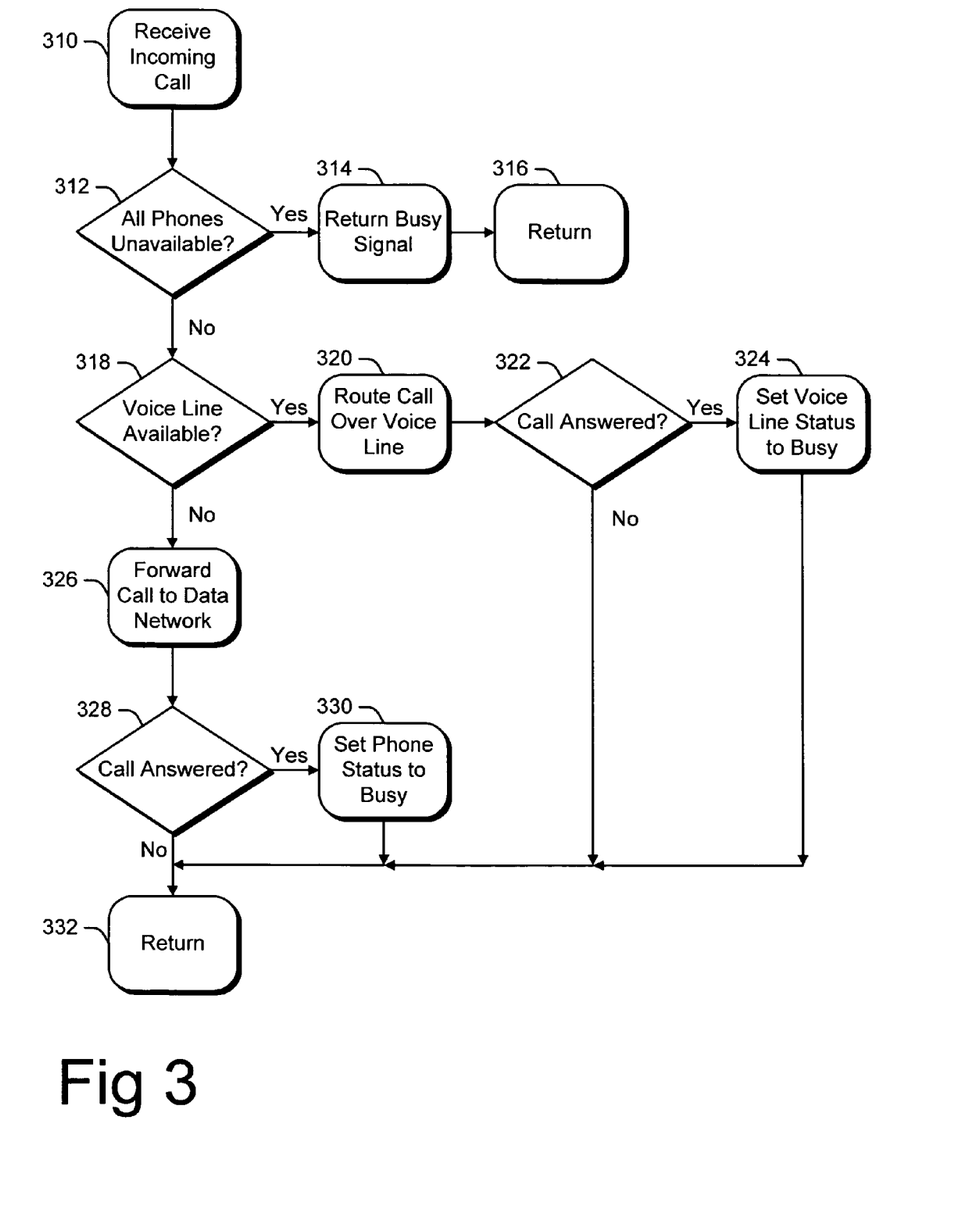
FIG. 3 is a flowchart illustrating call routing operations performed by a central office switch.

FIG. 3 is a flowchart illustrating call routing operations performed by a central office switch 122. In an exemplary implementation, the call routing operations may be used to transmit one or more POTS telephone call received from the PSTN 110 to the customer premise. Further, the call routing operations may be used to transmit multiple calls to the same telephone number at the customer premise, such that two or more telephones having the same telephone number at the customer premise can conduct separate phone calls simultaneously.

In brief, the operations of FIG. 3 enable a central office switch 122 to connect a POTS telephone call from the PSTN to a telephone at a subscriber premise 150. The central office switch receives the POTS telephone call directed to a telephone number associated with dedicated communication line 124 and routes the POTS call to a telephone connected to the dedicated communication line 124 if the dedicated communication line 124 is available. If the dedicated communication line 124 is unavailable, then the central office switch forwards the call to a data network for routing to a VoIP telephone connected to the dedicated voice connection.

Referring to FIG. 3, at operation 310 the central office switch 122 receives an incoming call from the PSTN 110 that is directed to the telephone number associated with the dedicated communication line 124. In modern telephone networks an incoming call may be preceded by call signaling pursuant to an intelligent signaling system such as, e.g., the SS7 signaling system. In such networks, the operations of FIG. 3 may be initiated by receipt of call signaling, rather than the call itself.

At operation 312 the central office switch determines whether all phones associated with the telephone number are unavailable. A phone may be unavailable if it is off-hook, disconnected from the network, or without electrical power. If all phones associated with the telephone number are busy, then at operation 314 the central office switch returns a busy signal to the calling party, and at operation 316 the central office switch 122 returns to normal operations to process another call.

By contrast, if at operation 312 all phones are not unavailable (i.e., if at least one phone is available) then control passes to operation 318, and the central office switch determines whether the dedicated communication line 124, traditionally referred to as the voice line, is available. If the dedicated communication line is available, then control passes to operation 320 and the incoming call is routed to the customer premise 150 over the dedicated voice line 124. Central office switch 122 may transmit an electrical signal (e.g., a voltage pulse) across dedicated communication line 124 that causes the telephone(s) connected to dedicated communication line 124 to ring. If, at operation 322, the call is answered then the central office switch sets the status of the dedicated communication line to busy. By contrast, if at operation 322 the call is not answered, then control passes to operation 332 and the central office switch 122 returns to normal operations to process another call.

If, at operation 318, the dedicated communication line 124 is not available, then control passes to operation 326 and the call is forwarded to the data network service provider 130 for completion over the data network. In one exemplary implementation central office switch 122 transmits a signal via communication link 126 to data network service provider 130 requesting that the call be completed via the data network service provider 130. The signal includes the telephone number associated with the dedicated voice connection. Operational details of connecting the call over the data network are described below in FIG. 4 and the accompanying text.

If, at operation 328, the data network service provider 130 reports that the call has been answered, then control passes to operation 330 and the central office switch sets the status of the phone(s) that connected to the incoming call as busy. By contrast, if at operation 328 the call is not answered, the control simply passes to operation 332 or forwards to voice mail and the central office switch 122 returns to normal operations to process another call.

The operation of FIG. 3 enable the central office switch 122 to complete a call from the PSTN 110 to the user premise 150 via the dedicated communication line 124, if the dedicated communication line 124 is available. If it is unavailable, then the call is routed to the user premise 150 via the data network service provider 130.

Figure 4:
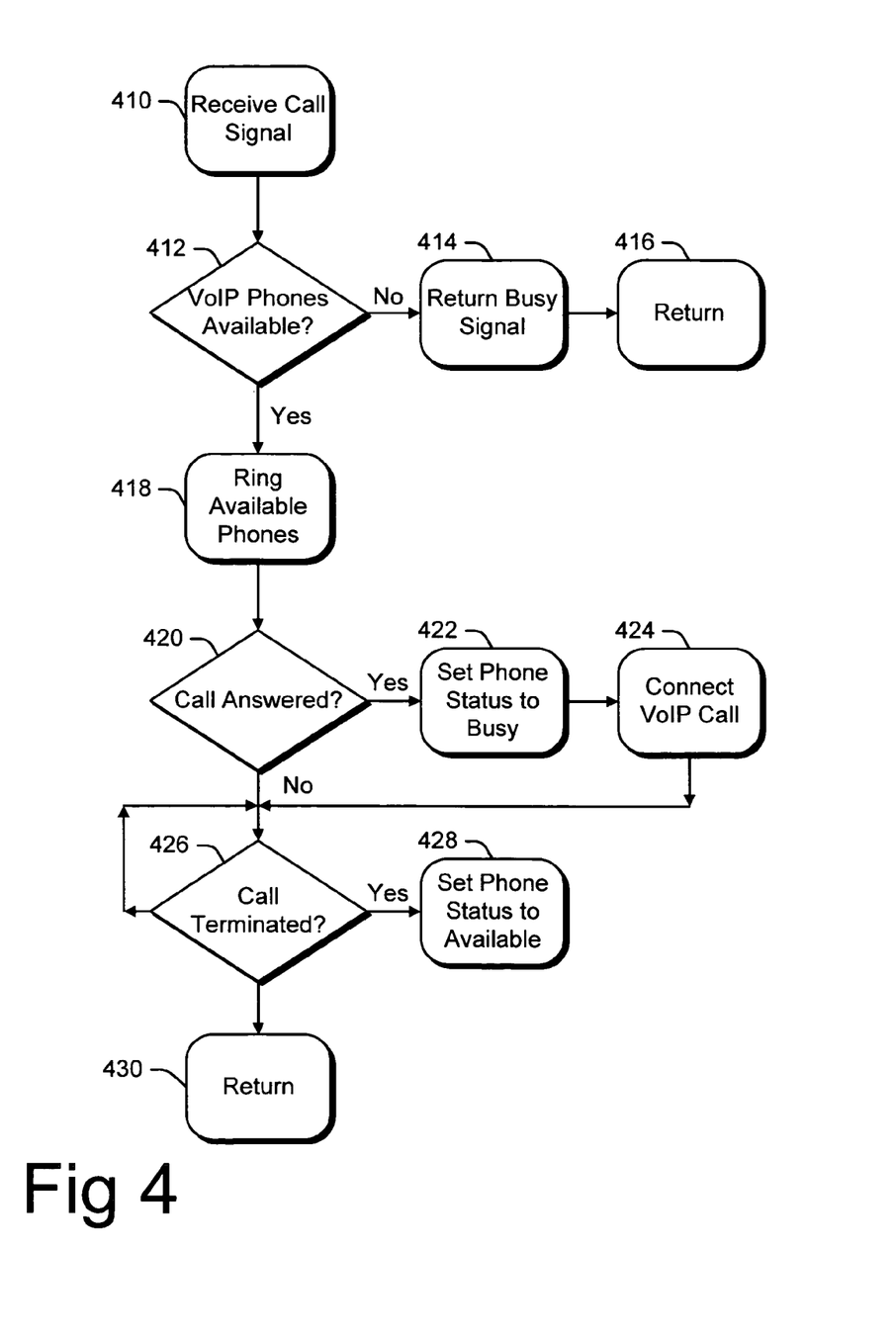
FIG. 4 is a flowchart illustrating call routing operations performed by a data network service provider.

FIG. 4 is a flowchart illustrating call routing operations performed by data network service provider 130. The operations of FIG. 4 enable a data network service provider to connect a POTS telephone call transmitted across the PSTN 112. In brief, the data network receives a signal from the telephone network that identifies the telephone number associated with the dedicated communication line 124. In response to the signal, the data network service provider 130 establishes a data connection between a VoIP gateway in the data network and a VoIP telephone connected to the dedicated communication line 124 and transmits a ring signal to the VoIP telephone.

Referring to FIG. 4, at operation 410 the data network service provider receives a call signal from the central office switch identifying the telephone number at the customer premise 150 and requesting the data network service provider 130 to complete the call. In an exemplary implementation the call signal may be processed by the VoIP gateway 132. In an alternate implementation the call signal may be processed by feature server 136, or another server operated by the data network service provider 130.

At operation 412 the data network service provider determines whether one or more VoIP phones such as VoIP phones 224a, 224b are available. If no VoIP phones are available, then control passes to operation 414 and the data network service provider returns a signal to the central office switch 122 indicating that no phones are available, i.e., a busy signal. The central office switch 122 may then return a busy signal to the calling party. At operation 416 the data network service provider 130 returns to normal operations to process another call or otherwise establish another data connection.

By contrast, if one or more VoIP phones are available, then control passes to operation 418 and the data network service provider rings the available VoIP phone(s). If the call is answered at one or more VoIP phones, then the data network service provider sets a flag indicating that the phone(s) are busy, and connects the VoIP call to the phone(s) answered (operation 424).

In an exemplary embodiment the data network service provider passes the call status back to the central office switch 122. The central office switch 122 (or a computing device associated with the central office switch 122) records the status of the VoIP phone(s) in a suitable memory location. The central office switch (or associated computing device) may consult this table in operation 312 to determine whether all phones associated with a particular telephone number are available.

Once the VoIP call is connected, the data network service provider 130 monitors the call status to determine whether the call has been terminated (operation 426). When the call is terminated, the data network service provider 130 sets resets the flag to indicate that the VoIP phone is now available. In an exemplary implementation this flag is forwarded to the central office switch 122 for recordation in a memory location, as described above.

At operation 430 the data network service provider 130 returns to normal operations to process another call or otherwise establish another data connection.

The network architecture of FIGS. 1-2 and the methods of FIGS. 3-4 enable a traditional POTS telephone service provider and a data network service provider to cooperate to provide expanded telephony service to a subscriber premise 150. The service permits a subscriber to leverage the traditional POTS telephone number associated with the dedicated communication line 124 between the central office switch and the customer premise to virtually any number of additional telephones. In an exemplary implementation, a first incoming call is routed to the subscriber premise over the dedicated communication line 124 in accordance with conventional POTS telephony. A second (or subsequent) call directed to the telephone number associated with the dedicated communication line 124 received while the dedicated communication line 124 is busy may be routed to one or more available VoIP phones 224a, 224b at the customer premise via the data network service provider 130. Accordingly, a call placed to the telephone number associated with the dedicated communication line 124 will not receive a busy signal, provided at least one telephone at the customer premise 150 is available.

Figure 5:
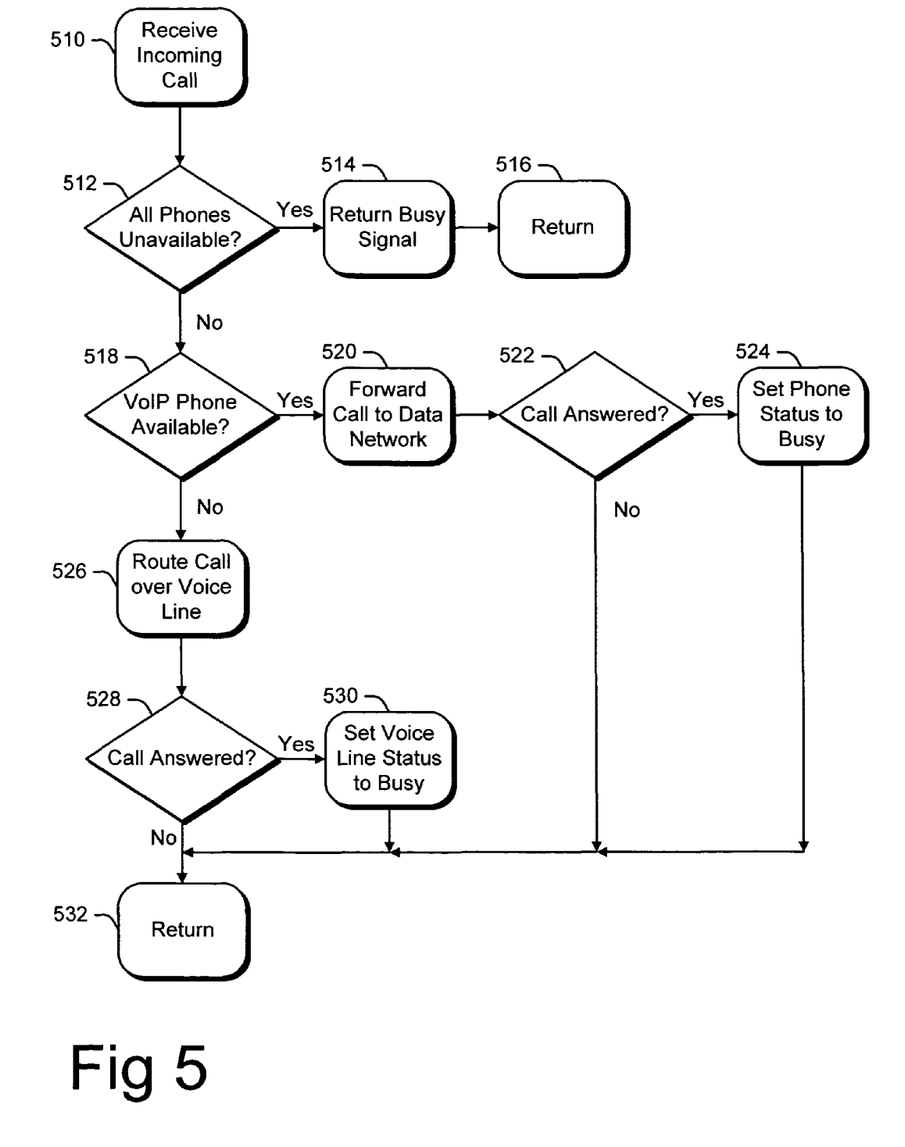
FIG. 5 is a flowchart illustrating call routing operations performed by a central office switch.

In alternate implementations the central office switch may be configured to route incoming calls to the data network service provider 130 for completion to available VoIP telephones before completing the call via the dedicated communication line. FIG. 5 is a flowchart illustrating alternate call routing operations performed by a central office switch 122. Referring to FIG. 5, at operation 510 the central office switch 122 receives an incoming call from the PSTN 110 that is directed to the telephone number associated with the dedicated communication line 124. Operations 510-516 are analogous to operations 310-316. The reader is referred to the text above describing these operations.

If at operation 512 all phones are not unavailable (i.e., if at least one phone is available) then control passes to operation 518, and the central office switch determines whether at least one VoIP phone is available. If at least one VoIP phone is available, then control passes to operation 520 and the incoming call is routed to the data network service provider 130 for further routing to an available VoIP phone(s) at the customer premise 150 over the data network 140. If, at operation 518, the dedicated communication line 124 is not available, then control passes to operation 526 and the call is forwarded to the data network service provider 130 for completion over the data network. In one exemplary implementation central office switch 122 transmits a signal via communication link 126 to data network service provider 130 requesting that the call be completed via the data network service provider 130. The signal includes the telephone number associated with the dedicated voice connection. The data network service provider 130 may connect the call over the data network as described above in FIG. 4 and the accompanying text.

If, at operation 522, the data network service provider 130 reports that the call has been answered, then control passes to operation 524 and the central office switch sets the status of the status of the phone(s) that connected to the incoming call as busy. By contrast, if at operation 522 the call is not answered, the control passes to operation 532 and the central office switch 122 returns to normal operations to process another call.

If at operation no VoIP phones are available, then control passes to operation 526 and the call is routed to the customer premise over the dedicated communication line 124. Central office switch 122 may transmit an electrical signal (e.g., a voltage pulse) across dedicated communication line 124 that causes the telephone(s) connected to dedicated communication line 124 to ring. If, at operation 528, the call is answered then the central office switch sets the status of the dedicated communication line to busy (operation 530). By contrast, if at operation 528 the call is not answered, then control passes to operation 532 and the central office switch 122 returns to normal operations to process another call.

The network architecture depicted in FIGS. 1-2 also enables a subscriber to leverage the dedicated communication line 124 to originate multiple telephone calls from the single telephone number associated with the dedicated communication line 124. In an exemplary implementation the data network service provider shares VoIP telephone status information with the central office switch 112 to allow the central office switch to monitor the status of the VoIP telephones at the subscriber premise.

Figure 6:
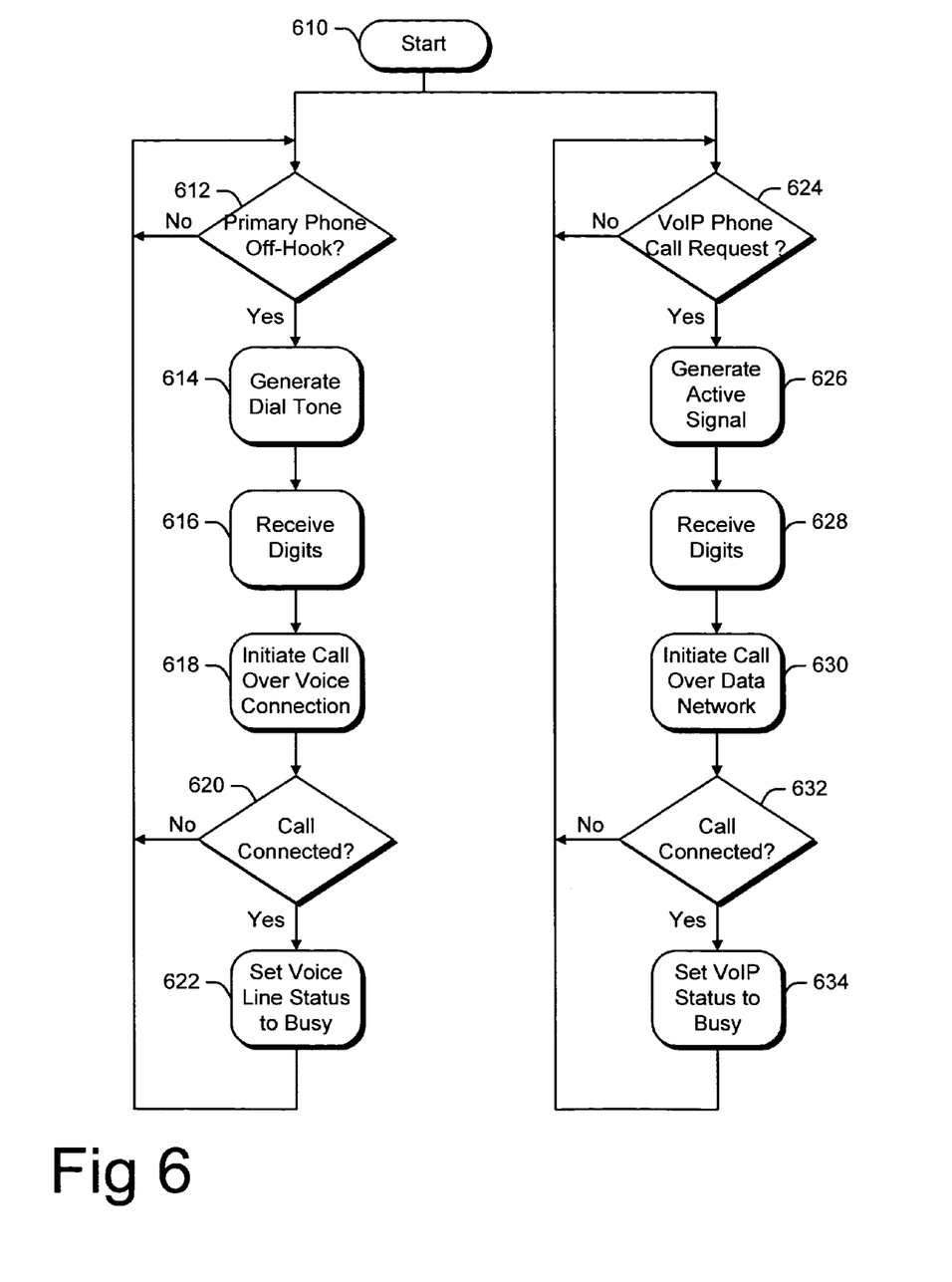
FIG. 6 is a flowchart illustrating operations in an exemplary process for originating calls from a customer premise.

FIG. 6 is a flowchart illustrating operations in an exemplary process for originating calls from a customer premise, such as customer premise 150. In the central office switch, the process starts at operation 610, and at operation 612 the central office switch 122 monitors the dedicated communication line 124 to determine whether a telephone connected to the dedicated communication line 124 transitioned from an on-hook state to an off-hook state. At operation 612 a telephone connected to the dedicated communication line 124 is termed a "primary" telephone. VoIP telephones capable of operating in a conventional POTS mode may function as a primary telephone for the purposes of FIG. 6.

When the central office switch 612 detects a state transition from an on-hook stat to an off-hook state, control passes to operation 614 and the central office switch 122 generates an electrical signal that produces a dial tone on the primary telephone. At operation 616 the central office switch 122 receives a plurality of digits from the primary telephone (e.g., as DTMF signals) and at operation 618 the central office switch 122 originates a call over the PSTN using the received digits. The central office switch 122 may also execute conventional error processing routines to determine whether the received digits correspond to a valid telephone number.

In one implementation the VoIP telephones are blocked from accessing the call originated from the primary telephone. This implementation is particularly useful when the VoIP phones are also capable of operating as conventional POTS telephones. This blocking may be accomplished in the VoIP adapter 218a, 218b by severing a logical connection between the VoIP telephone(s) and the dedicated communication line 124.

If at operation 622 the call is not connected (i.e., if the called party does not answer the call) then control passes back to operation 612 and the central office switch continues to monitor the dedicated communication line 124 for a transition from an on-hook state to an off-hook state. By contrast, if, at operation 622, the call is connected (i.e., if the called party answers the call), then the central office switch sets the status of the dedicated voice line to busy. The status may be stored in a suitable memory location associated with the central office switch, or with a computing device (e.g., a server) associated therewith.

At operation 624, the data network service provider 130 monitors the VoIP phone(s) for a call request. In a VoIP phone a call request may be embodied as a service request from a VoIP telephone. If the VoIP phone is designed to emulate a conventional POTS telephone, then the service request may be triggered by a transition of the VoIP phone from an on-hook state to an off-hook state.

When the data network service provider 130 receives a service request from a VoIP phone, control passes to operation 626 and the data network service provider transmits an active signal to the VoIP telephone indicating that the VoIP telephone is in an active mode and ready to receive digits. In one implementation the active signal may emulate a conventional POTS telephony dial tone, while in other implementations the active signal may comprise a pre-recorded message indicating that the VoIP phone is operational or other signaling indicia. At operation 628 the data network service provider receives digits that the caller enters into the VoIP telephone and at operation 630 the data network service provider initiates the call over the data network 140 using the received digits.

In one exemplary implementation the call may be routed to the called number via the PSTN 112. In this implementation the data network service provider may forward the call to the central office switch 122 via communication link 126. In alternate implementations, e.g., when the called number is a VoIP number, the call may be carried to the destination entirely by a data network such as data network 140.

At operation 634 the data network service provider sets the status of the VoIP phone to busy. In an exemplary implementation this status information is forwarded to the central office switch 122, which may record the status in a suitable memory location. This central office switch uses this status information when routing incoming calls, as described in connection with operations 312, 318, and 412. When the VoIP call is terminated the data network service provider resets the VoIP phone status to available. This status information may also be passed to the central office switch 112, which can update its data tables accordingly.

By executing the operations of FIG. 6 and sharing phone status information, the data network service provider 130 cooperates with the telephone network central office 120 to enable a subscriber at customer premise 150 to leverage the single telephone number associated with the dedicated communication line 124 to originate multiple telephone calls from the subscriber premise 150.

Exemplary Computing System

Figure 7:
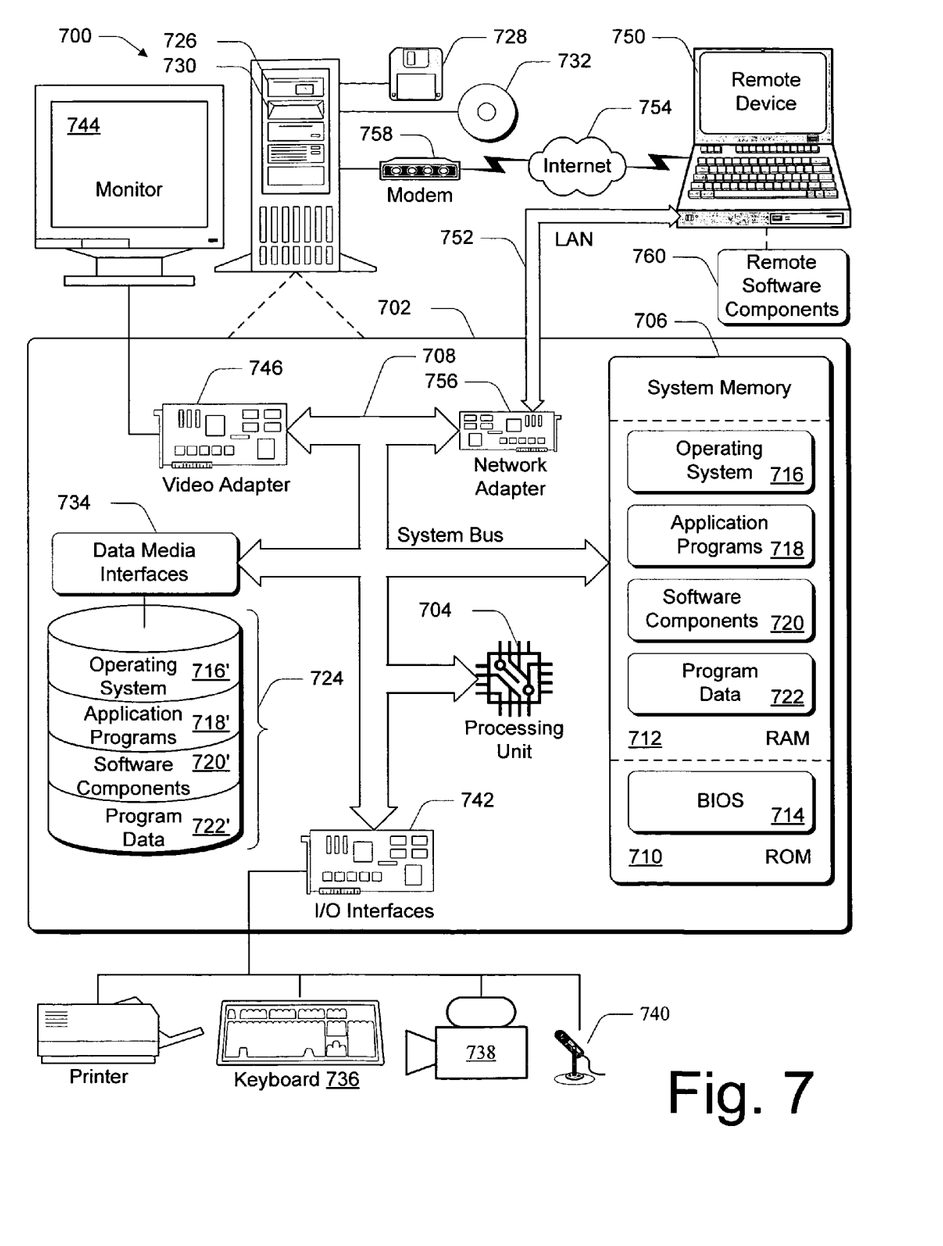
FIG. 7 is a schematic illustration of an exemplary computing system.

The various components and functionality described herein may be implemented with one or more of individual computers such as, e.g., servers. FIG. 7 shows components of an exemplary server computer, referred by to reference numeral 700. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 700 may include, but are not limited to, a processing unit 704, a system memory 706, and a system bus 708 that couples various system components including the system memory to the processing unit 704. The system bus 708 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 700 typically includes a variety of computer-readable media. Computer-readable media can be any available media that can be accessed by computer 700 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 700. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 706 includes computer storage media in the form of volatile and/or nonvolatile memory such as read only memory (ROM) 710 and random access memory (RAM) 712. A basic input/output system 714 (BIOS), containing the basic routines that help to transfer information between elements within computer 700, such as during start-up, is typically stored in ROM 710. RAM 712 typically contains data and/or program modules that are immediately accessible to and/or presently being operated on by processing unit 704. By way of example, and not limitation, FIG. 7 illustrates operating system 716, application programs 718, other program modules 720, and program data 722.

The computer 700 may also include other removable/non-removable, volatile/nonvolatile computer storage media. By way of example only, FIG. 7 illustrates a hard disk drive 724 that reads from or writes to non-removable, nonvolatile magnetic media, a magnetic disk drive 726 that reads from or writes to a removable, nonvolatile magnetic disk 728, and an optical disk drive 730 that reads from or writes to a removable, nonvolatile optical disk 732 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 724 is typically connected to the system bus 708 through a non-removable memory interface such as data media interface 734, and magnetic disk drive 726 and optical disk drive 730 are typically connected to the system bus 708 by a removable memory interface.

The drives and their associated computer storage media discussed above and illustrated in FIG. 7 provide storage of computer-readable instructions, data structures, program modules, and other data for computer 700. In FIG. 7, for example, hard disk drive 724 is illustrated as storing operating system 716', application programs 718', other program modules 720', and program data 722'. Note that these components can either be the same as or different from operating system 716, application programs 718, other program modules 720, and program data 722. Operating system 716, application programs 718, other program modules 720, and program data 722 are given different numbers here to illustrate that, at a minimum, they are different copies. A user may enter commands and information into the computer 700 through input devices such as a keyboard 736, a mouse, trackball, or touch pad. Other input devices (not shown) may include a microphone, joystick, game pad, satellite dish, scanner, or the like. These and other input devices are often connected to the processing unit 704 through an input/output (I/O) interface 742 that is coupled to the system bus, but may be connected by other interface and bus structures, such as a parallel port, game port, or a universal serial bus (USB). A monitor 744 or other type of display device is also connected to the system bus 708 via an interface, such as a video adapter 746. In addition to the monitor 744, computers may also include other peripheral output devices (e.g., speakers) and one or more printers, which may be connected through the I/O interface 742.

The computer may operate in a networked environment using logical connections to one or more remote computers, such as a remote computing device 750. The remote computing device 750 may be a personal computer, a server, a router, a network PC, a peer device or other common network node, and typically includes many or all of the elements described above relative to computer 700. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 700 is connected to the LAN 752 through a network interface or adapter 756. When used in a WAN networking environment, the computer 700 typically includes a modem 758 or other means for establishing communications over the Internet 754. The modem 758, which may be internal or external, may be connected to the system bus 708 via the I/O interface 742, or other appropriate mechanism. In a networked environment, program modules depicted relative to the computer 700, or portions thereof, may be stored in the remote computing device 750. By way of example, and not limitation, FIG. 7 illustrates remote application programs 760 as residing on remote computing device 750. It will be appreciated that the network connections shown are exemplary and other means of establishing a communications link between the computers may be used.

Conclusion

Although the described arrangements and procedures been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter. In particular, it will be appreciated that while DSL and cable modem networks have been described herein, the particular network protocol and/or configuration is not important.

The invention claimed is:

1. A method of originating multiple calls from a single POTS telephone line, comprising:
   detecting, at a central office switch, a change in status of a first telephone at the POTS telephone line from an on-hook status to an off-hook status wherein the first telephone is connected to the central office switch with a dedicated voice connection;
   in response to the change in status of the first telephone, at the central office switch:
      generating a dial tone for the first telephone;
      receiving a plurality of digits from the first telephone; and
      initiating a first call over the dedicated voice connection using the plurality of digits;
      setting the status of the dedicated voice connection to busy at the central office switch;
   detecting, at a data network connection point, a change in status of a second telephone at the POTS telephone line from an on-hook status to an off-hook status, wherein the second telephone is a Voice over Internet Protocol ("VoIP") telephone;
   in response to the change in status,
      generating a signal indicating that the second telephone is operational;
      receiving a plurality of digits from the second telephone; and
      initiating a second call over a data network using the plurality of digits, wherein the second call is a VoIP call, wherein initiating the second call over a data network using the plurality of digits comprises: translating the plurality of digits into a network address; and establishing a data connection to the network address;
      setting the status of the second VoIP telephone to busy at the data network;
      forwarding the busy status of the second VoIP telephone from the data network to the central office switch.

2. The method of claim 1, wherein receiving a plurality of digits from the first telephone comprises receiving a plurality of DTMF signals from the first telephone.

3. The method of claim 1, wherein initiating the first call over a voice connection using the plurality of digits comprises originating a call at the central office switch.

4. The method of claim 1, further comprising:
   in response to the change in status of the first telephone, blocking access for the second telephone to the voice connection.

5. The method of claim 4, wherein blocking access for the second telephone to the voice connection comprises severing a logical connection between the second telephone and the voice connection.

6. The method of claim 1, wherein generating a signal indicating that the second telephone is operational comprises generating a dial tone.

7. The method of claim 1, wherein generating a signal indicating that the second telephone is operational comprises playing a pre-recorded voice message indicating that the second telephone is operational.

8. The method of claim 1, wherein initiating the second call over a data network using the plurality of digits comprises transmitting call signaling information associated with the second call via the data network.

9. The method of claim 8, wherein the call signaling information includes a POTS telephone number, and wherein the data network connection point forwards the call initiated on the data network to the central office switch via a communication link for transmission to the destination via a public switched telephone network.

10. A method of originating multiple calls from a single POTS telephone line, comprising:
  connecting, at a central office switch, a call originating at a first telephone having the POTS telephone line via a dedicated voice connection;
  setting the status of the dedicated voice connection to busy at the central office switch;
  blocking access to the dedicated voice connection for a second telephone coupled to the POTS telephone line, wherein the second telephone is a Voice over Internet Protocol ("VoIP") telephone;
  connecting a VoIP call originating at the second telephone via a data network connected to the dedicated voice connection;
  setting the status of the second VoIP telephone to busy at the data network; and
  forwarding the busy status of the second VoIP telephone from the data network to the central office switch; displaying, on a third telephone, an indicator that a call is connected over the data network; receiving, at the third telephone, a signal requesting access to the dedicated voice connection; and in response to the signal, enabling the third telephone to access the data connection.

11. The method of claim 10, wherein connecting a call originating at a first telephone coupled to the POTS telephone line via a dedicated voice connection comprises:
  detecting, at a central office switch, an off-hook condition at the first telephone; and
  generating a dial tone for the first telephone.

12. The method of claim 11, further comprising, at the central office switch:
  receiving a plurality of digits from the first telephone; and
  initiating the call over a voice connection using the plurality of digits.

13. The method of claim 10, wherein blocking access for the second telephone to the voice connection comprises severing a logical connection between the second telephone and the voice connection.

14. The method of claim 10, wherein connecting a call originating at the second telephone via a data network connected to the dedicated voice connection comprises:
  detecting, at a data network connection point, a change in status of the second telephone from an on-hook status to an off-hook status; and
  generating a signal indicating that the second telephone is operational.

15. The method of claim 14, further comprising:
  receiving a plurality of digits from the second telephone; and
  initiating the call over a data network using the plurality of digits.

16. The method of claim 10, further comprising:
  displaying, on the second telephone, an indicator that a call is connected over the dedicated voice connection;
  receiving, at the second telephone, a signal requesting access to the dedicated voice connection; and
  in response to the signal, enabling the second telephone to access the dedicated voice connection.

17. The method of claim 10, further comprising:
  assigning a single call identifier to the call originating at the first telephone and the call originating at the second telephone.

18. The method of claim 14, further comprising forwarding the call initiated on the data network to the central office switch via a communication link for transmission to the destination via a public switched telephone network.

19. The method of claim 1, further comprising:
  using the status indicator associated with the dedicated voice connection at the central office switch to route incoming calls to the second, VoIP, telephone; and
  using the status indicator associated with the second, VoIP telephone at the central office switch to route incoming calls to the dedicated voice connection.

20. The method of claim 10, further comprising:
  using the status indicator associated with the dedicated voice connection at the central office switch to route incoming calls to the second, VoIP, telephone; and
  using the status indicator associated with the second, VoIP, telephone at the central office switch to route incoming calls to the dedicated voice connection.

* * * * *